United States Patent [19]

Reinhard

[11] 3,754,193

[45] Aug. 21, 1973

[54] INPUT BIAS AND SIGNAL CONDITIONING CIRCUIT FOR DIFFERENTIAL AMPLIFIERS

[76] Inventor: Clyde J. Reinhard, 220 ½ Reposado, La Habra Heights, Calif.

[22] Filed: Apr. 19, 1971

[21] Appl. No.: 135,148

[52] U.S. Cl. .................... 330/30 R, 330/22, 330/24, 330/40, 330/137

[51] Int. Cl. .................................................. H03f 3/68

[58] Field of Search ................. 330/9, 22, 40, 30 D, 330/30 R, 24, 207, 137, 52

[56] References Cited

UNITED STATES PATENTS

| | | | |
|---|---|---|---|
| 3,435,360 | 3/1969 | Carrol | 330/137 X |
| 3,196,362 | 7/1965 | Smith, Jr. | 330/30 R X |
| 3,406,351 | 10/1968 | Brouwer | 330/30 R X |
| 3,510,684 | 5/1970 | Martin | 330/9 X |

*Primary Examiner*—Roy Lake
*Assistant Examiner*—Lawrence J. Dahl
*Attorney*—Raymond L. Madsen

[57] ABSTRACT

The input terminals of the first stage of a multistage amplifier are connected to a network comprising four strings of unidirectional devices. The first and second strings are connected in series and poled in a first direction between the input terminals of the first stage. The second and third strings are connected in series between the input terminals and poled opposite to the first direction. The junctions between the first and second strings and the third and fourth strings are joined and a voltage potential applied thereto. In response to the voltage potential a bias current is conducted to the first stage through the second and fourth strings, the first and third strings being reverse biased. The first and third strings become forward biased to clamp the input terminals to the voltage potential when the magnitude of signal voltage at the input terminals with respect to circuit ground exceeds the magnitude of the voltage potential. The first stage is coupled to a second stage, circuit ground of the first stage being isolated from circuit ground of the second stage and is coupled to a pair of zener diodes which are in turn connected in series and similarly poled and across which is generated an alternating voltage limited in amplitude by the zener voltage of the diodes. The junction of the diodes is connected to the circuit ground of the first stage. A pair of impedances couple current from the diode pair to the input terminals of the first stage. The alternating current applied to the input terminals produces a voltage proportional to any impedance which may be connected between the input terminals whereby such impedance is measured.

10 Claims, 3 Drawing Figures

INVENTOR.
CLYDE J. REINHARD
BY
Raymond L. Madsen
ATTORNEY

INVENTOR.
CLYDE J. REINHARD
BY
Raymond L. Madsen
ATTORNEY

INPUT BIAS AND SIGNAL CONDITIONING CIRCUIT FOR DIFFERENTIAL AMPLIFIERS

The present invention relates to differential amplifiers and more particularly to input bias and signal conditioning circuits for biopotential and impedance pneumograph differential amplifiers.

In the field of differential amplifiers and in particular biopotential amplifiers, it has been the practice to provide bias to the pair of input terminals of the first stage through large valued impedance elements such as resistors or through the impedance of a subject being measured and connected to the input terminals of the amplifier. The magnitudes of the bias coupling resistors are selected to provide the required bias current and/or voltage to the input terminals of the amplifier while simultaneously furnishing large impedances to both common and differential mode signals that may be applied to the amplifier input terminals.

When differential amplifiers are used or employed for the measurement of impedances such as the impedance pneumograph, it has been the practice to apply separate signal generators to provide signal conditioning in the form of known voltage or current to an unknown impedance of the subject being measured and to use the amplifier to measure the current or voltage response, respectively.

Some amplifiers have used electromagnetic coupling in combination with modulators and demodulators to obtain common mode rejection and isolation between a measurement subject and measurement equipment with associated power supplies.

Although these methods and apparatus have served the purpose, they have not proved satisfactory under all conditions of service for the reason that considerable difficulty has been experienced with the generation of interfering common mode signals and with the lack of sufficient rejection of common mode signals to enable the measurement of low-level differential mode signals.

The measurement of electrical signals from a living subject in the presence of high common mode signals between the subject and the measurement equipment has long been the concern of designers of differential amplifiers for biological measurements. Although amplifiers have been designed with greater than 120 db of common mode rejection, a high unbalance of impedance in the input leads to the amplifier coupled with common mode shunting impedance can produce a differential mode input from a common mode signal and degrade the high common mode rejection of the amplifier. The resistor bias impedances connected to the input terminals of the amplifier are a source of common mode shunting impedance. To provide sufficient common mode rejection, very costly and complex circuits have been developed to sense common mode signals and to drive the input stages of the amplifier in a manner to reduce the effect of common mode unbalance in the input leads.

Another concern of biopotential amplifier designers has been the protection of the low-level signal input stages from both common mode and differential mode input signal overload. Without overload protection, low power transistor input stages can be destroyed by large differential and common mode signals exceeding the designed operating range of the amplifier. A pair of parallel, back-to-back diodes connected between the input terminals of the amplifier have served to limit the differential input signal voltages and currents when used in cooperation with series impedance in each of the input leads. Also, diode clamp circuits have been utilized to prevent large common mode signals from overdriving th amplifier input stage.

Isolation between the subject being measured and the measuring equipment has long been recognized by designers of biological monitoring equipment as one of the most critical problems. Although transformer isolation with electromagnetic coupling of only the desired signals has been used successfully, the use of separate signal conditioning circuits connected to the amplifier input terminals substantially reduces this isolation. As a result, a living subject being measured is exposed to the hazards of possible high currents and voltages that may exist between the signal conditioning equipment and the subject.

The present invention fulfills the need for an amplifier input bias circuit which does not degrade common mode rejection. In addition, the problems of isolation and poor common mode rejection of amplifiers with signal conditioning are overcome by the present invention.

The general purpose of this invention is to provide input bias and signal conditioning circuits for biopotential and impedance pneumograph differential amplifiers which embrace all the advantages of similarly employed differential amplifiers and which possess none of the aforedescribed disadvantages. To attain this, the present invention contemplates a unique circuit arrangement of unidirectional conducting devices connected between the input terminals of a differential amplifier and an electromagnetically coupled signal conditioning circuit whereby common mode, isolation and overload problems are avoided.

An object of the present invention is the provision of input bias and overload protection while preserving high common mode rejection for a differential amplifier.

Another object is to provide signal conditioning from the common alternating drive signal for the modulator and demodulator of a transformer coupled differential amplifier whereby high common mode rejection and isolation are maintained.

A further object of the invention is the provision of input bias for a differential amplifier by which the voltage of the input terminals of the amplifier with respect to a reference potential is maintained at a magnitude determined by the voltage drop of a plurality of series connected forward biased diodes.

Still another object is to provide input bias current to a biopotential differential amplifier which is not conducted through the subject being measured.

Yet another object of the present invention is the provision of signal conditioning for an impedance pneumograph differential amplifier having transformer isolation in which the signal conditioning circuit is insensitive to capacitive pick-up and stray capacitive coupling of unwanted signals.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
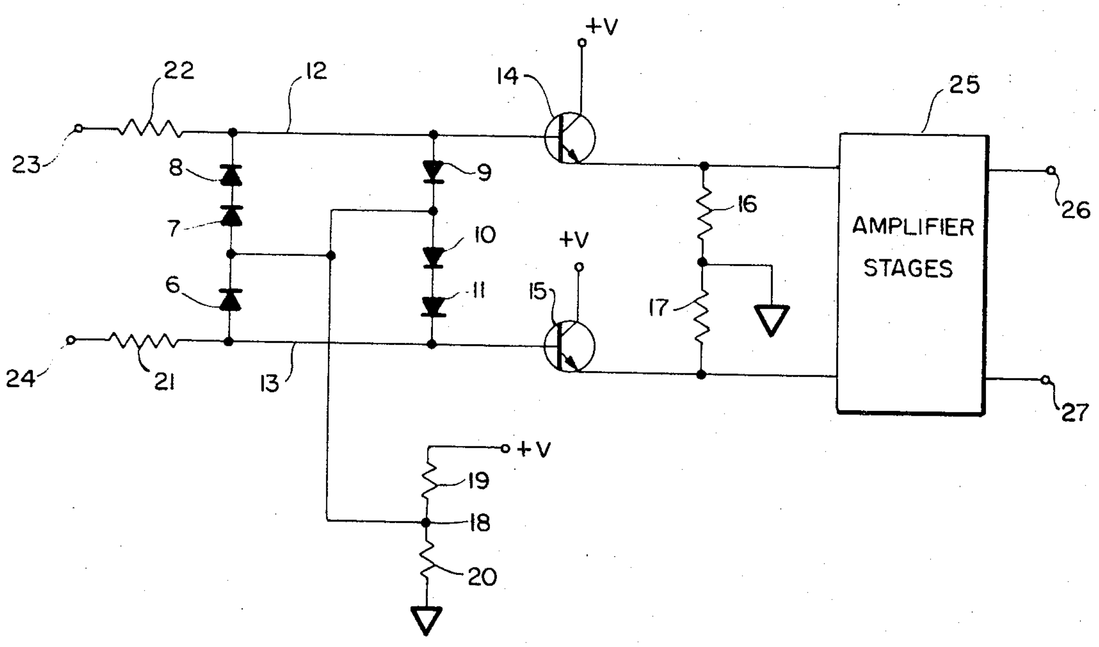
FIG. 1 illustrates a circuit diagram of a preferred embodiment of the invention wherein bias and overload protection are provided to a pair of input transistors of a differential amplifier.

Turning now to FIG. 1, four strings of unidirectional conducting devices such as diodes are utilized to provide bias to the input of a differential amplifier. A first string comprising diode 6 is connected to a second string comprising diodes 7 and 8. The devices are poled in the same direction and connected between amplifier input lines 12 and 13. Although only diode 6 is illustrated in the first string and diodes 7 and 8 in the second string, it should be understood that one or more diodes may be utilized in each string depending on the magnitude of input signal voltages contemplated.

A third string of unidirectional devices comprising diode 9 is connected in series with a fourth string comprising diodes 10 and 11. The third and fourth strings are connected between input lines 12 and 13 and poled in the opposite direction to the first and second strings. Again, it should be understood that one or more diodes may be used in each string. Generally one more diode appears in the second and fourth strings than are inserted in the first and third strings but this arrangement is not essential and the same number may be used in each string as discussed hereinafter.

The junction of diodes 6 and 7 and diodes 9 and 10 are connected together and to junction 18 of resistors 19 and 20, the other end of resistor 19 being connected to a voltage +V and the other end of resistor 18 being connected to input circuit ground.

Lines 12 and 13 are connected to the bases of transistors 14 and 15, respectively. The emitters of transistors 14 and 15 are connected to resistors 16 and 17, respectively, the other end of resistors 16 and 17 being connected to input circuit ground. Lines 12 and 13 also are connected through resistors 22 and 21 to input terminals 23 and 24, respectively. The emitters of transistors 14 and 15 are further connected through amplifier stage 25 to output terminals 26 and 27.

Figure 2:
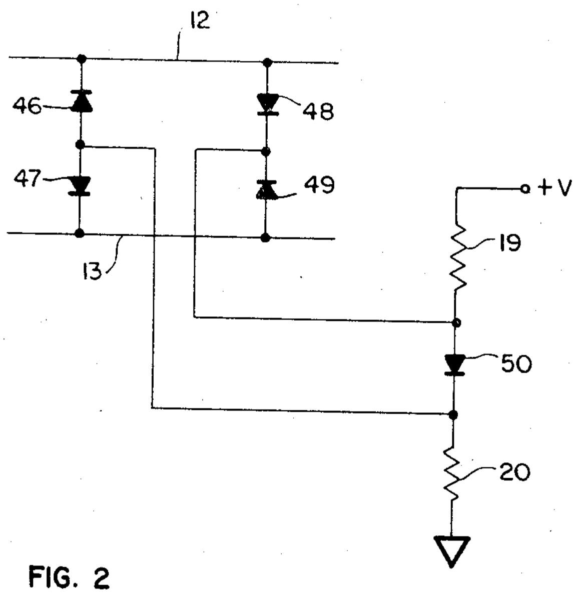
FIG. 2 is an alternate embodiment of the circuit of FIG. 1.

Turning to FIG. 2, an alternate bias circuit to that shown in FIG. 1 is illustrated, having two pairs of series connected diodes connected in parallel between lines 12 and 13. Diodes 46 and 47, comprising one pair, have their anodes connected together with the cathode of diode 46 connected to line 12 and the cathode of diode 47 to line 13. Diodes 48 and 49, comprising the other pair, have their cathodes connected together and with the anode of diode 48 connected to line 12 and the anode of diode 49 connected to line 13. Instead of resistors 19 and 20 being joined as illustrated in FIG. 1, a diode 50 is connected between them and poled in a direction to be forward biased by resistor 19 connected to +V. The junction of diode 46 and 47 is connected to the cathode of diode 50 which is joined to resistor 20 and the junction of diodes 48 and 49 is connected to the anode of diode 50 which is joined to resistor 19. It should be clear that although single diodes are shown in the circuit, two or more diodes may be inserted in place of the single diode to provide different bias and clamping conditions as taught by the present invention.

Figure 3:
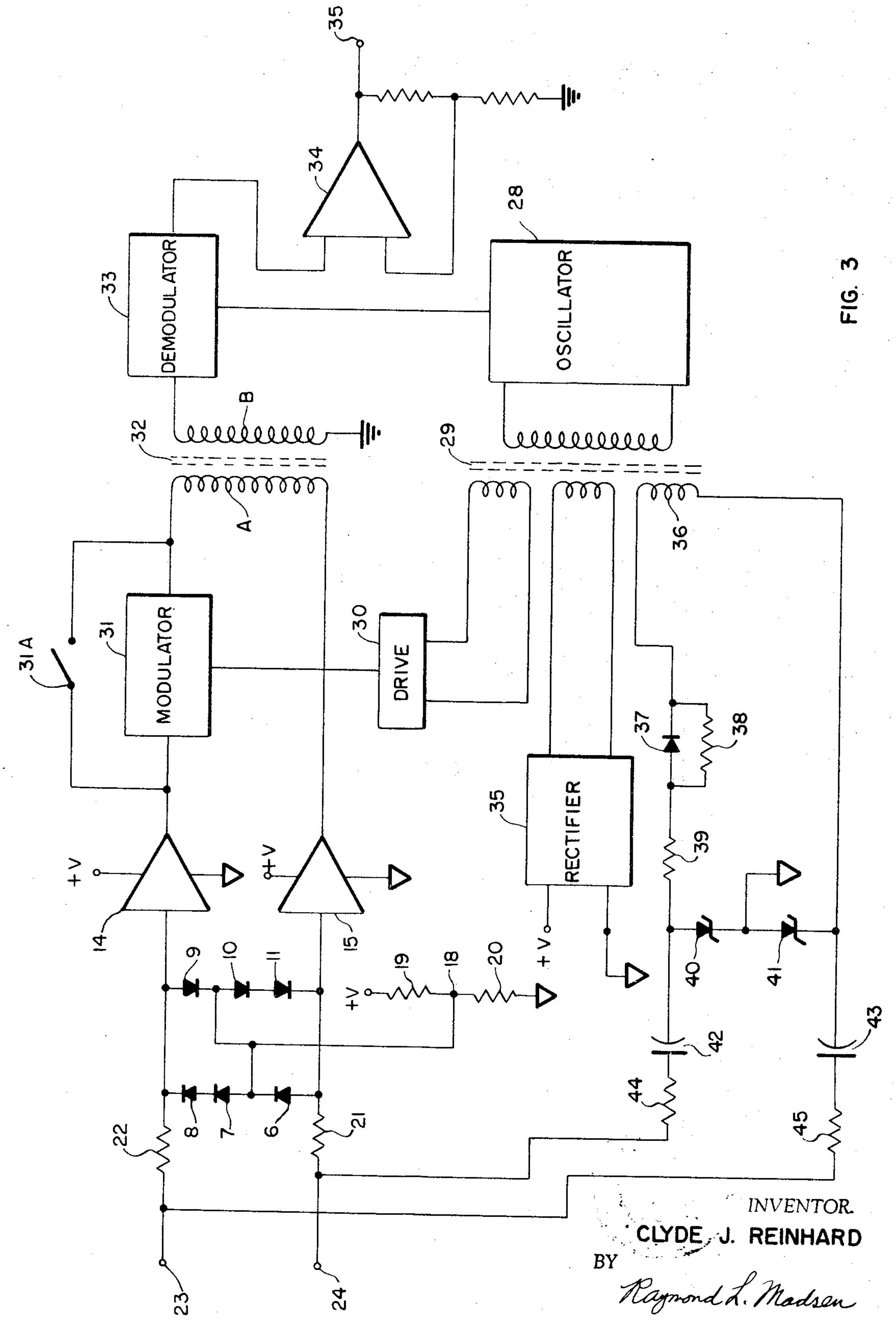
FIG. 3 is a combination of a circuit and block diagram illustrating an amplifier having signal conditioning and input bias circuits as taught by the present invention.

Referring now to FIG. 3, there is illustrated a transformer coupled differential amplifier having as the input stage thereto the first stage described in FIG. 1. Transistors 14 and 15 are shown as amplifier symbols 14 and 15 which are connected to the series combination of modulator 31 and winding A of transformer 32. Winding B of transformer 32 is connected between output circuit ground and modulator 32 which in turn is connected to the input to amplifier 34. Modulator 31 and demodulator 32 may be semiconductor switches such as field effect transistors or similar devices well known to the field of electronic switching.

Oscillator 28 drives demodulator 32 directly and is coupled electromagnetically through transformer 29 to driver 30 which drives modulator 31 in synchronism with modulator 32. Rectifier 35 is also coupled through transformer 29 to oscillator 28 and provides a source of +V voltage to bias the input stage, 14 and 15. Rectifier 35 may be a unidirectional device such as a diode connected in cooperation with a filter circuit well known to the art of d.c. power supplies.

Oscillator 28 is further coupled to winding 36 of transformer 29, which winding is connected to the parallel combination of diode 37 and resistor 38. Diode 37 and resistor 38 are connected further to the series combination of resistor 39 and zener diodes 40 and 41. The zener diodes are poled in the same direction having the anode of diode 40 connected to resistor 39 and the cathode of diode 41 connected to the other end of winding 36.

Capacitor 42 is connected between the junction of diode 40 and resistor 39 and one end of resistor 44, the other end of resistor 44 being connected to input terminal 24. Similarly, capacitor 45 is connected between the junction of diode 41 and winding 36 and one end of resistor 45, the other end of resistor 45 being connected to terminal 23.

The operation of the input bias circuit can be best understood by reference to FIG. 1, wherein +V produces a bias potential at terminal 18 through the divider network comprising resistors 19 and 20. Diodes 7 and 8 of the second string are forward biased along with diodes 10 and 11 of the fourth string to provide a bias current into the bases of transistors 14 and 15, respectively. Because of the forward voltage drop of diodes 7 and 8 and diodes 10 and 11, diodes 9 and 6 are reversed biased, respectively. By reason of the small base bias current required by low-level transistor amplifier stages typical of biopotential amplifiers, a current of very small magnitude is conducted by the forward biased diodes. Therefore, the diode impedances are relatively large in magnitude compared to a heavily conducting forward biased diode thereby resulting in very little loading of the input circuit.

If a differential input signal is applied between terminals 23 and 24, current will be conducted through resistors 22 and 21 and through the base emitter junctions of each of transistors 14 and 15. Depending upon the momentary polarity of the input signal, current will be conducted into one base and out of the other. This signal current, therefore, subtracts from the bias current supplied to one transistor and adds to the bias current of the other. As the input signal magnitude increases, keeping the same polarity, a point is reached where the signal current becomes the only current into one base, the voltage on that base being the same as the bias potential on terminal 18, and the other base is clamped to the bias potential at 18 through the forward conducting diode string connected thereto.

The above circuit function is best analyzed by assuming an input signal applied to terminals 23 and 24 having a momentary polarity of plus to minus from 23 to 24. The base current into transistor 14 increases accordingly and the potential of the base of transistor 14 increases with respect to the bias potential at 18. On the other hand current is removed from the base of transistor 15 causing its base potential to fall relative to the potential at 18. The rise and fall of base voltages continues until the base potential of transistor 14 approaches the potential at 18. At this point diodes 7 and 8, which were forward biased, approach a reversed bias condition. In addition, slightly forward biased diodes 10 and 11 become more heavily conducting and begin to clamp the base potential of transistor 15 to the bias potential at 18 through the low forward impedance of the forward biased diode. As the signal current is increased further, diodes 7 and 8 are reversed biased and diode 9, which was reversed biased, becomes forward biased to complete a forward conducting string of diodes for the increasing signal current through diodes 9, 10 and 11. Therefore, a complete clamping action is performed upon the signal current to prevent differential overloading that could cause damage to the input transistors 14 and 15. In this clamping condition, resistances 21 and 22 limit the signal current which can be conducted by the clamping diodes.

It should be clear that, for input signals of opposite polarity, a similar action takes place with the diode strings comprising diodes 6, 7 and 8, therefore completing a symmetrical clamping action to alternating input signals of overload magnitude.

Overload protection from common mode input signals is also provided. If the same input voltage is applied to terminals 23 and 24 with respect to input circuit ground, this results in a common mode input signal being impressed on transistors 14 and 15. Assuming the polarity of the common mode signal is positive with respect to the potential at 18, diodes 9 and 6 become forward biased and clamp the bases of transistors 14 and 15, respectively, to the potential at 18. Conversely, when the common mode signal becomes negative with respect to the bias at 18, diodes 7, 8, and 10, 11 become forward biased to clamp the bases against the potential at 18.

It should be clear that under normal conditions of low-level signal operation diodes 7,8 and 10,11 are slightly forward biased and, hence, still in a high impedance region of conductance while diodes 6 and 9 are reversed biased and are substantially non-conducting. If transistors 14 and 15 are chosen to be of different polarity than shown in FIG. 1, then the diodes illustrated are connected in a reversed polarity direction from that indicated along with changing +V to −V. Except for the reversed directions of polarity and conductivity, the circuit functions similarly to that described herein before.

The operation of the circuit of FIG. 2 is very similar to that described in respect to FIG. 1. Since diode 50 is forward biased, there is a potential drop across diode 50 which reverse biases diodes 48 and 49 forward biases diodes 46 and 47 under conditions of no input signal. Diodes 46 and 47 are slightly forward biased to provide the bias described before for input transistors 14 and 15, respectively. Therefore, as before, a high impedance is maintained in the forward biased diodes. When an input signal is applied to the input lines, the maximum voltage drop below the voltage at the junction of diode 50 and resistor 19 that either input line 12 or 13 can assume is the forward biased voltage drop of two diodes in series, including diode 50 and either of diodes 46 and 47 depending upon whether line 12 or line 13 is observed. Further, the maximum voltage that either line can rise to is two forward biased diode voltage drops above the voltage potential at the junction of diode 50 and resistor 20. Therefore, complete clamping action is provided to both differential and common signals as before in respect to the circuit of FIG. 1.

Turning now to FIG. 3, there is illustrated common oscillator 28 for operating modulator 31 and demodulator 32 in synchronism to provide isolation of the circuit ground of input stages 14 and 15 from the circuit ground of output stage 34 by transformer 32. This method of isolating common mode signals in amplifiers is well known to one skilled in the art of amplifier design. Slowly changing differential signals applied to input terminals 23 and 24 are amplified in stages 14 and 15 to be applied through modulator 31 to winding A of transformer 32. Modulator 31 modulates or "chops" the signal applied thereto to obtain an alternating signal for application to winding A. This alternating signal is electromagnetically coupled through transformer 32 to winding B and demodulator 32 where the original signal applied to modulator 31 is reconstructed through the synchronous operation of the modulator and demodulator. Therefore, a signal of such slowly varying character, normally not capable of being electromagnetically coupled practically, is transmitted through the coupling transformer 32.

In addition, it is known in the art of transformer isolated amplifiers to use another winding on the transformer to obtain a source of voltage bias from which the input stages of the amplifier may be biased or powered. In FIG. 3 rectifier 35 is connected to a winding on transformer 29 to rectify the alternating oscillator signal thereby obtaining the supply voltage +V from which stages 14 and 15 are powered.

However, it is contemplated within the present invention, in addition to those circuits set forth herein before, to provide still another winding 36 on transformer 29 from which an alternating signal from oscillator 28 is generated for the purposes of providing signal conditioning for utilization with the input stages 14 and 15 of the amplifier. The alternating voltage from winding 36 is applied to zener diodes 40 and 41 through current limiting resistance 39 and an equalizing impedance of diode 37 in parallel with resistor 38. Therefore, as the voltage from winding 36 alternately reverses polarity, the pair of zener diodes are alternately biased with diodes 40 and 41 reversed biased to their zener breakdown voltage and then diodes 40 and 41 forward biased to a normal diode conduction voltage, thereby clamping the diode pair to input circuit ground through the biased diodes. By means of this clamping action, what would normally be a high impedance point in the circuit becomes a low impedance point and substantially insensitive to capacitive coupling of noise and unwanted interferring signals. In addition, the zener voltage provides regulation of the voltage amplitude with the benefit of a more stable signal for signal conditioning.

Since in most applications, the oscillator signal coupled through transformer 29 will not have a symmetrical wave form as a consequence of the modulator and demodulator drive characteristics it may be necessary to introduce some equalizing impedance into the signal conditioning winding to compensate for the lack of symmetry. An example of such an impedance is illustrated by diode 37 in parallel with resistor 38. This equalizing impedance compensates for the unequal rise and fall characteristics of the waveform generated at winding 36 by introducing resistor 38 in series with resistor 39 when diode 37 is reversed biased in response to a winding voltage of corresponding polarity and then shunts resistor 38 with forward biased diode 37 with a winding voltage of opposite polarity. However, it should be clear that other equalizing networks may be utilized and are contemplated by the present invention.

The clamped, alternating voltage appearing across diodes 40 and 41 is capacitively coupled through capacitors 42 and 43 to resistors 44 and 45, respectively, whereby a signal current is generated and applied to terminals 24 and 23, respectively. Resistors 44 and 45 are of such a magnitude to determine the magnitude of the current thus generated. Therefore, when the amplifier is used as an impedance pneumograph, the signal conditioning current from resistors 44 and 45 is conducted through the impedance of the subject connected between terminals 23 and 24 and produces a voltage proportional to the magnitude of such impedance. This voltage is amplified by the amplifier for further monitoring and measurement. The magnitudes of resistors 21, 22, 44 and 45 are generally larger than the impedances expected to be encountered from the measurement subjects.

It now should be apparent that the present invention provides a circuit arrangement which may be employed in conjunction with biopotential amplifiers and impedance pneumographs for providing input bias and overload protection through four strings of diodes connected in a certain polarity arrangement to a source of bias potential and for providing signal conditioning from a common oscillator in a transformer isolated amplifier for utilization with impedance pneumograph amplifiers.

Although particular components and circuit arrangements have been discussed in connection with a specific embodiment of an amplifier constructed in accordance with the teachings of the present invention others may be utilized. Furthermore, it will be understood that although an exemplary embodiment of the present invention has been disclosed and discussed, other applications and circuit arrangements are possible and that the embodiments disclosed may be subjected to various changes, modifications and substitutions without necessarily departing from the spirit of the invention.

What is claimed is:

1. An input bias circuit of interconnected unidirectional conductive devices for biasing an amplifier of the type having a pair of differential input signal terminals, comprising:

first, second, third and fourth strings of series connected like poled unidirectional conductive devices, each string having at least one device therein, said first and fourth strings being connected in parallel and poled in opposite directions and said second and third strings being connected in parallel and poled in opposite directions, thereby forming two sets of parallel strings, said two sets being connected in series between the pair of differential input signal terminals of the amplifier, the junction between said two sets of parallel strings having a voltage potential applied thereto for normally providing bias current through said first and third strings to the pair of differential input signal terminals and for normally rendering said second and fourth strings non-conductive, said second and fourth strings becoming conductive to clamp the pair of differential input terminals to said junction potential when the magnitude of an input signal renders said first and third strings non-conductive.

2. The circuit of unidirectional conductive devices described in claim 1 wherein said unidirectional conductive devices are diodes.

3. The circuit of unidirectional conductive devices described in claim 2 wherein said first and third strings each include two diodes.

4. The circuit of unidirectional conductive devices described in claim 3 wherein said second and fourth strings each include one diode.

5. A diode circuit connected between first and second input terminals of a differential amplifier for providing bias and overload protection, comprising:

a first diode having the cathode thereof connected to the first input terminal of the differential amplifier;

a second diode having the cathode thereof connected to the anode of said first diode;

a third diode having the cathode thereof connected to the anode of said second diode, the anode of said third diode being connected to the second input terminal of the differential amplifier;

a fourth diode having the cathode thereof connected to the second input terminal of the differential amplifier;

a fifth diode having the cathode thereof connected to the anode of said fourth diode;

a sixth diode having the cathode thereof connected to the anode of said fifth diode, the anode of said sixth diode being connected to the first input terminal of the differential amplifier;

conductive means for connecting the junction of said first and second diodes with the junction of said fourth and fifth diodes, said conductive means having a voltage potential applied thereto to normally provide bias current through said second and third diodes to the second input terminal of the differential amplifier and bias current through said fifth and sixth diodes to the first input terminal of the differential amplifier, said first and fourth diodes being normally reversed biased and becoming conductive only when the magnitude of a signal current which may be applied to the amplifier input terminals exceeds the respective bias currents.

6. A biopotential amplifier of the type wherein the first stage having a first circuit ground and a pair of input terminals adapted to be connected to an external impedance is coupled to a second stage having a second circuit ground and wherein said first and second grounds are electrically isolated from one another, the improvement comprising:

oscillator means for generating an alternating signal;

a pair of zener diodes connected in series similarly poled, the junction between said pair of diodes being connected to said first circuit ground;

means for coupling said oscillator means to the unjoined electrodes of said pair of zener diodes thereby applying said oscillator means alternating signal across said pair of zener diodes whereby the diodes of said pair of zener diodes alternately are forward biased and then reversed biased to their zener breakdown potential, respectively;

impedance means for coupling an alternating current from said pair of zener diodes to the input terminals of the amplifier first stage, said impedance means being large in magnitude relative to the external impedance connected between the input terminals whereby said alternating current conducted through said impedance means is proportional to the zener breakdown potential of said pair of zener diodes which current in turn is conducted through the external impedance thereby generating a voltage between the terminals of the first stage proportional to the magnitude of the external impedance connected therebetween.

7. The biopotential amplifier of claim 6 wherein said means for coupling is a transformer.

8. An impedance pneumograph amplifier for measuring a biological impedance, comprising:

a first amplifier stage having a pair of input and output terminals and a first circuit ground, said pair of input terminals being adapted to connect said first amplifier stage to an external biological impedance;

a second amplifier stage having an input and an output terminal and a second circuit ground;

first coupling means including a modulator, a transformer and a demodulator connected in series between said first amplifier pair of output terminals and said second amplifier input terminal and second circuit ground for electrically isolating said first circuit ground from said second circuit ground and for coupling a signal between said first amplifier output terminals and said second amplifier input terminal and second circuit ground;

a pair of zener diodes connected in series and similarly poled, the junction between said pair being connected to said first circuit ground;

oscillator means connected to said second circuit ground for generating an alternating signal with respect to said second circuit ground;

second coupling means connected between said oscillator means and the unjoined electrodes of said pair of zener diodes for isolating said first and second grounds and for coupling said oscillator means alternating signal to said pair of zener diodes, said pair of zener diodes alternately being forward biased and reversed biased to generate across said pair of zener diodes an alternating voltage having a fixed amplitude determined by the zener voltage of said pair of zener diodes and referenced to said first circuit ground; and third coupling means connected between said pair of zener diodes and said first amplifier pair of input terminals said third coupling means having an impedance magnitude substantially larger than the magnitude of the external biological impedance connected to said pair of input terminals whereby an alternating current proportional to said alternating voltage across said pair of zener diodes is conducted to said input terminals and through said external biological impedance thereby generating a voltage between said input terminals proportional to said external biological impedance connected therebetween.

9. A circuit of unidirectional devices connected between first and second input terminals of a differential amplifier for providing bias and overload protection, comprising:

first and second strings of unidirectional devices connected in series between the input terminals and poled in opposite directions;

third and fourth strings of unidirectional devices connected in series between the input terminals and poled in opposite directions, said third and fourth strings being poled opposite to said first and second strings;

a fifth string of unidirectional devices connected between the junctions of said first and second strings and said third and fourth strings; and a first and second resistor connected respectively to the junction of said first and second strings and said third and fourth strings, the unconnected ends of said resistors having a voltage potential applied thereacross whereby said first, second and fifth strings are rendered conductive to provide bias to the input terminals, said third and fourth strings being non-conductive until the magnitude of an input signal renders said third and fourth strings conductive and said first and second strings non-conductive thereby providing overload protection.

10. The circuit of unidirectional devices described in claim 9 wherein said first, second, third, fourth and fifth strings each include one diode.

* * * * *